United States Patent [19]
Stoll et al.

[11] Patent Number: 5,892,864
[45] Date of Patent: Apr. 6, 1999

[54] OPTICAL 1×N AND N×N SWITCHING MATRIX HAVING A TREE STRUCTURE

[75] Inventors: Lothar Stoll; Meinrad Schienle; Gustav Müller, all of München, Germany

[73] Assignee: Siemens Aktiengesellschaft, Munich, Germany

[21] Appl. No.: 793,297

[22] PCT Filed: Sep. 13, 1995

[86] PCT No.: PCT/DE95/01254

§ 371 Date: Mar. 11, 1997

§ 102(e) Date: Mar. 11, 1997

[87] PCT Pub. No.: WO96/08932

PCT Pub. Date: Mar. 21, 1996

[30] Foreign Application Priority Data

Sep. 14, 1994 [DE] Germany .......................... 44 32 728.5

[51] Int. Cl.⁶ .................................................. G02B 6/35
[52] U.S. Cl. .............................................. 385/14; 385/40
[58] Field of Search ................................. 385/17, 16, 25, 385/40, 41, 45, 50

[56] References Cited

U.S. PATENT DOCUMENTS

| | | | |
|---|---|---|---|
| 4,798,435 | 1/1989 | Fujiwara et al. | 385/17 |
| 4,932,735 | 6/1990 | Koai | 385/17 |
| 4,934,775 | 6/1990 | Koai | 385/14 |
| 4,998,791 | 3/1991 | Koai | 385/2 |
| 5,002,352 | 3/1991 | Koai | 385/16 |
| 5,009,477 | 4/1991 | Alferness et al. | 385/17 |
| 5,303,315 | 4/1994 | Granestrand | 385/16 |
| 5,640,471 | 6/1997 | Khan et al. | 385/17 |

FOREIGN PATENT DOCUMENTS

| | | |
|---|---|---|
| 0 390 002 | 3/1990 | European Pat. Off. . |
| 0 353 871 | 7/1990 | European Pat. Off. . |
| 2310543 | 12/1990 | Japan ......................... 385/17 |
| 5313214 | 11/1993 | Japan ......................... 385/17 |

OTHER PUBLICATIONS

Acklin et al. "Novel optical switches based on carrier injection in three and five waveguide couplers:TIC and SIC", Electronis Letters, pp. 217–218, Feb. 1994.
Electronics Letters, vol. 26, No. 1, 4 Jan. 1990, Granestrand P et al, Integrated Optics 4×4 Switch Matrix with Digital Optical Switches, pp. 4–5.
Proceedings of the European Conference on Optical Communication, vol. 2, 12 Sep. 1993, Nagase R et al, Silica–Based 8×8 Optical–Matrix Switch Module with Hybrid Integrated Driving Circuits, pp. 17–20.
Electronics Letters, vol. 23, No. 8, 09 Apr. 1987, Habara K et al, Geometrical Design Considerations for a Three–Structured Optical Switch Matrix, pp. 376–377.
Journal of Lightwave Technology, vol. 7, No. 7, Jul. 1989, Okayama H et al, Optical Switch Matrix with Simplified N×N Tree Structure, pp. 1023–1028.

*Primary Examiner*—John D. Lee
*Assistant Examiner*—Ellen E. Kang
*Attorney, Agent, or Firm*—Hill & Simpson

[57] ABSTRACT

Optical 1×N and N×N switching matrix has a tree structure. In the case of 1×N switching matrices having a tree structure, in which an optical input ($1_0$) is connected to N outputs ($1_1$) by means of an optical waveguide structure (1) which branches like a tree, and in which an optical changeover switch (4) is arranged in each junction point (3) of the waveguide structure, it is intended to improve the crosstalk suppression. To this end, in each case one gate switch (5) is assigned to each output ($1_1$) for optional release and blocking of this output ($1_1$) as a function of a switching state of the changeover switch (4) of a junction point (3) from which a branching waveguide (11) is connected to this output ($1_1$). An N×N switching matrix, which is also described, having greatly improved crosstalk suppression can be obtained with such 1×N switching matrices. The switching matrix is used in optical communications networks, for example telecommunications networks.

27 Claims, 6 Drawing Sheets

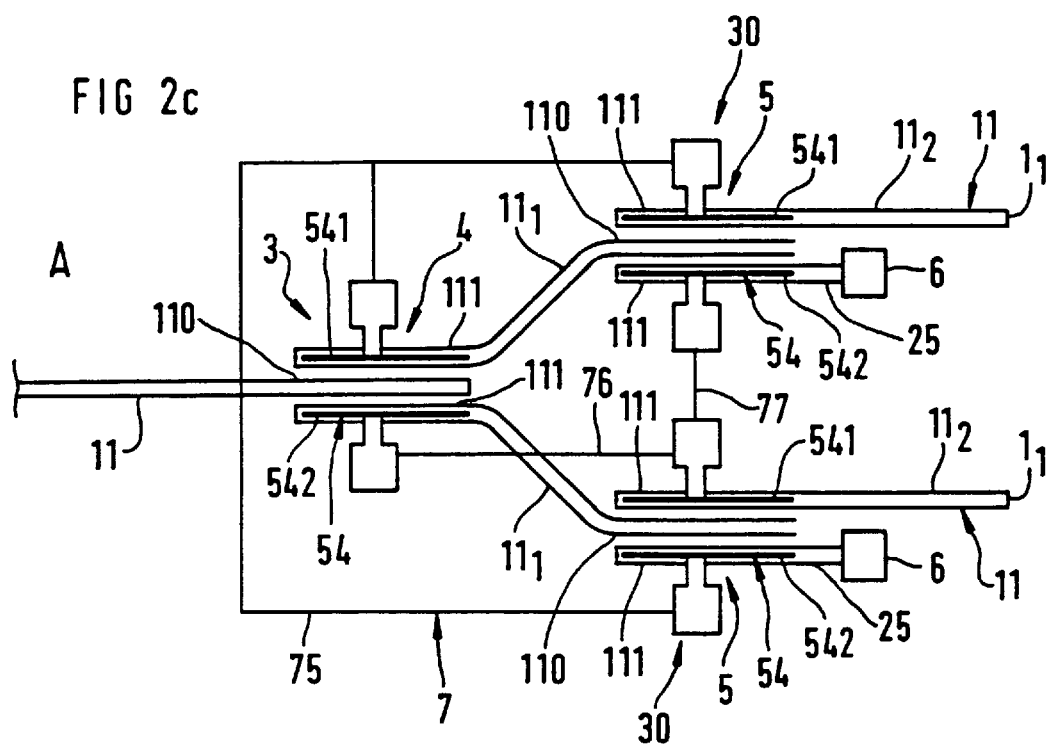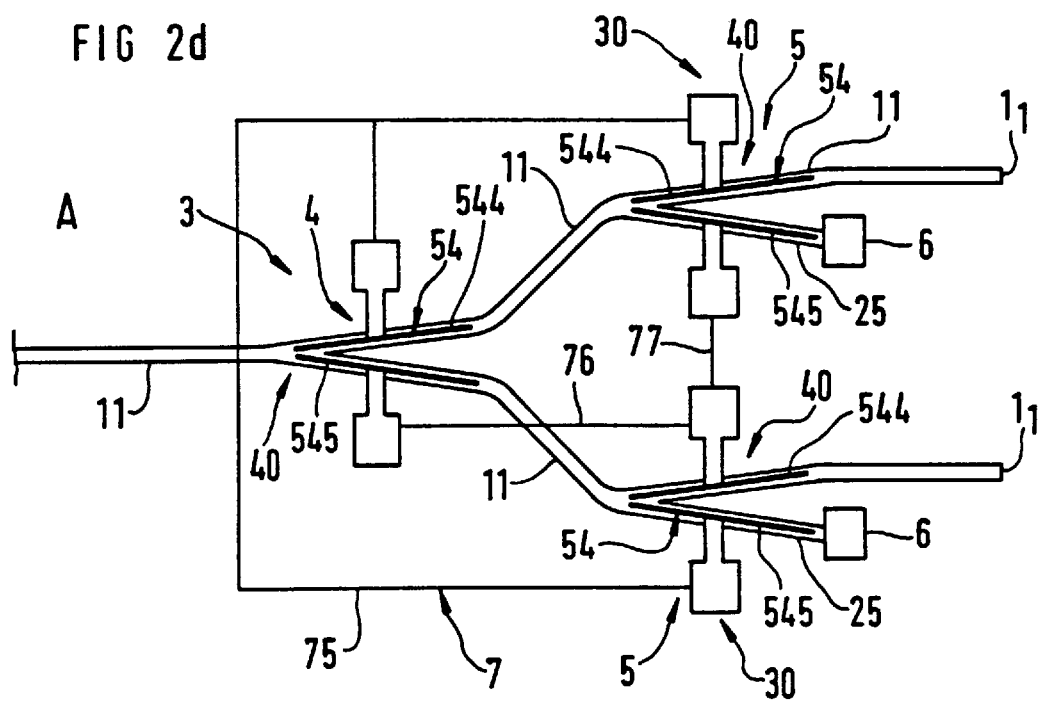

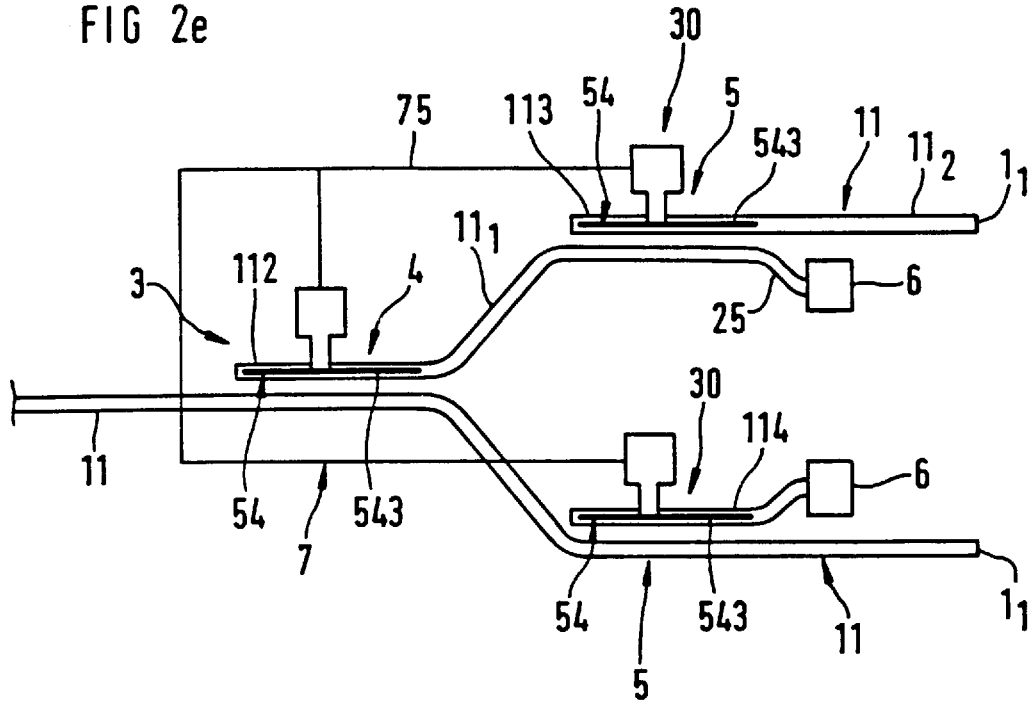
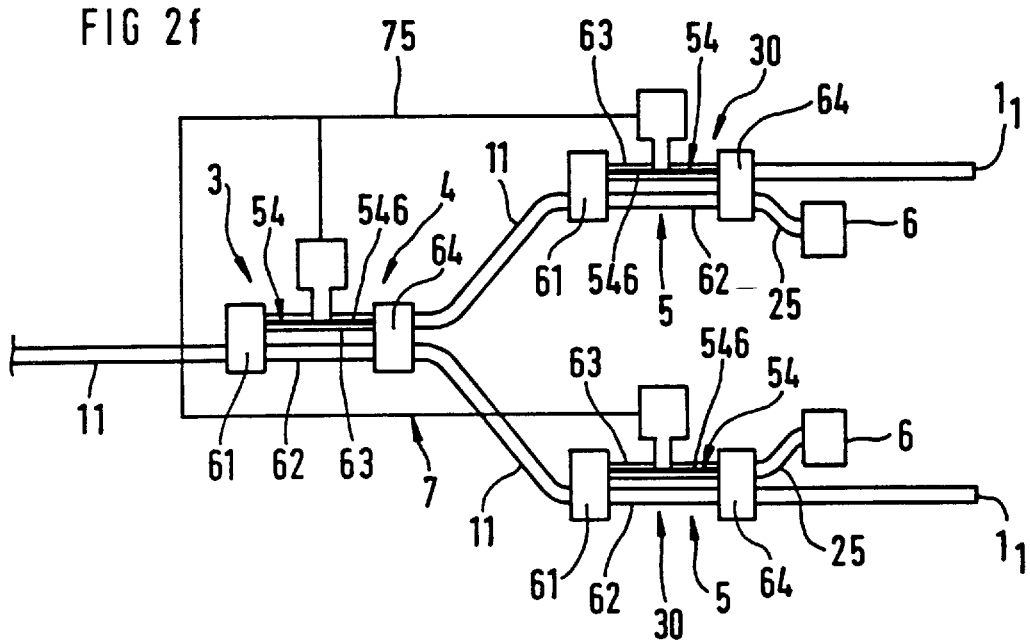

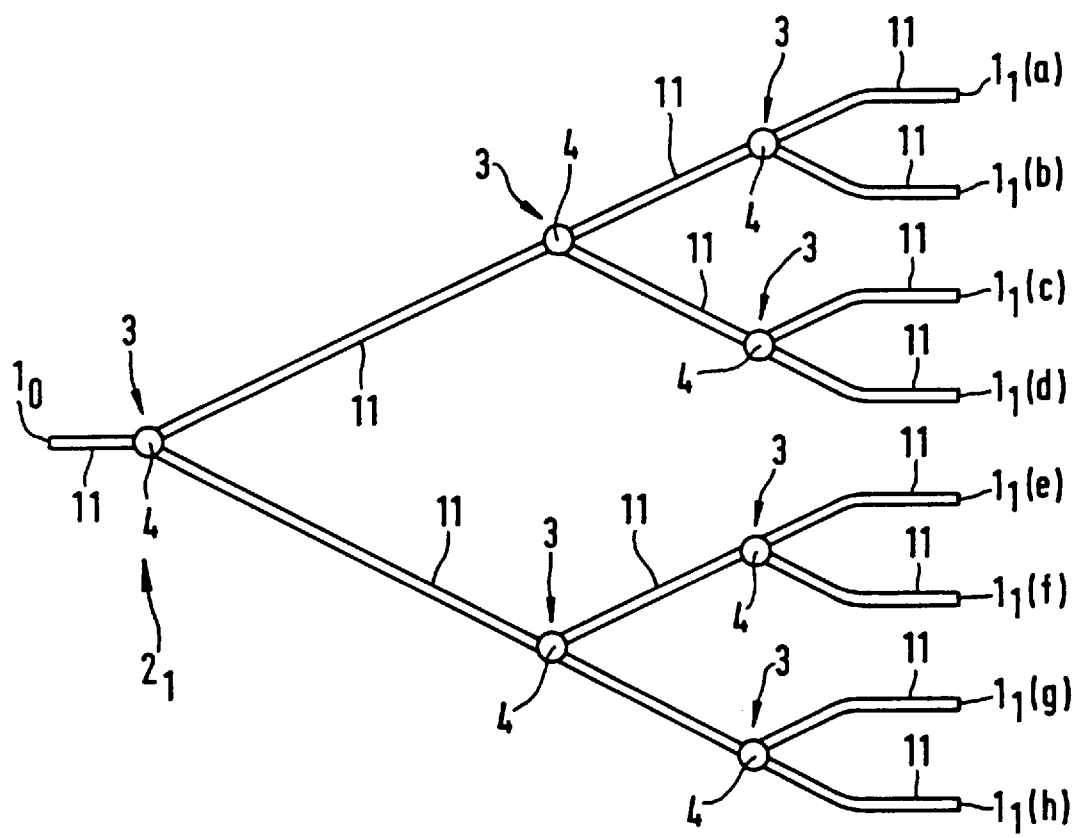

OPTICAL 1×N AND N×N SWITCHING MATRIX HAVING A TREE STRUCTURE

BACKGROUND OF THE INVENTION

The invention relates to an optical 1×N and N×N switching matrix having a tree structure, with an optical input/output and a plurality of optical outputs/inputs.

Such switching matrices are generally known.

Optical switching matrices are key components of future optical communications networks. They enable the optical data stream to be directed in a flexible manner between different optical glass fibers or other optical waveguides without any limitation of the data rate.

Solid-state switching matrices which are integrated on a substrate are particularly compact and promise cost advantages over currently available electromechanical components (available, for example, from JDS FITEL, ASTARTE, OptiVideo, BT&D). Such solid-state switching matrices have been implemented on substrates composed, for example, of $LiNbO_3$ (see P. J. Duthie, M. J. Wale "16×16 single chip optical switch array in Lithium Niobate", Electron. Lett., Vol. 27, pages 1265–1266, 1991), silicon (see R. Nagase, A. Himeno, K. Kato, O. Okuno "Silica-based 8×8 optical-matrix-switch module with hybrid integrated driving circuits", ECOC '93, Montreux, Paper MoP1.2, pages 17–20) or III-V semiconductors (see K. Komatsu, K. Hamamoto, M. Sugimoto, A. Ajisawy, Y. Kohga, A. Suzuki "4×4GaAs/AlGaAs optical matrix switches with uniform device characteristics using alternating $\Delta\beta$ electrooptic wave directional couplers", J.Lightwave Technol., Vol. LT-9, pages 871–878, 1991 and L. Stoll, G. Müller, M. Hoilsberg, M. Schienle, S. Eichinger, U. Wolff "4×4 optical switch matrix on InP with low switching current", AEÜ, Vol. 46, pages 116–118).

SUMMARY OF THE INVENTION

The invention is based on the object of providing switching matrices of the said type having crosstalk suppression which is greater than that of the known switching matrices of this type.

In general terms the present invention is an optical 1×N switching matrix having a tree structure with an optical input/output and a number N of optical outputs/inputs. An optical waveguide structure connects the input/output to each output/input and is composed of optical waveguides which branch like a tree from the input/output in the direction of the outputs/inputs at junction points. One optical changeover switch is provided per junction point for optionally switching over between waveguides which branch off from this junction point. An optical gate switch is assigned to at least one output/input for optional optical release and blocking of this output/input as a function of a switching state of the changeover switch of a junction point from which one branching waveguide is connected to this output/input.

In each case one gate switch is assigned to each output/input for optional release and blocking of this output/input as a function of a switching state of the changeover switch of a junction point from which a branching waveguide is connected to this output/input.

The present invention is also an optical N×N switching matrix having a tree structure with a number N of optical inputs and N of optical outputs. Two matrix rows have in each case N optical 1×N switching matrices, each 1×N switching matrix having in each case one optical input/output and in each case N optical outputs/inputs. An optical switching network has two connection rows having in each case N×N optical connections, each of which is used as an optical input and/or output. It is possible to connect each connection in a connection row optically to each connection in the other connection row. The total of N×N optical outputs/inputs of the N optical 1×N switching matrices in each matrix row is connected in parallel to the N×N optical connections of in each case one connection row. The total of N optical inputs/outputs of the N optical 1×N switching matrices of each matrix row form the N inputs and/or N outputs of the N×N switching matrix. At least one optical 1×N switching matrix is a 1×N switching matrix. Each optical 1×N switching matrix is a 1×N switching matrix.

At least the waveguide structure, the changeover switch and the gate switch of a 1×N switching matrix are integrated on a common substrate.

The changeover switch of a junction point from which a branching waveguide is connected to an output/input to which a gate switch is assigned. This gate switch itself, in each case has an electrically controllable optoelectronic switch having an electrode arrangement for which electrical control signals for switching this switch between at least two switching states exists. The gate switch, in one of these switching states, releasing the output/input to which it is assigned. The changeover switch is switched to the branching waveguide which is connected to this output/input and releases the waveguide. The other switching state, the changeover switch blocks this branching waveguide, and the gate switch blocks this output/input.

The electrode arrangement of a gate switch and the electrode arrangement of a changeover switch are conductively connected to one another by means of an electrical lead arrangement.

A gate switch which is assigned to an output/input has an on and off switch which is arranged in the branching optical waveguide which connects a junction point to this output/input.

A gate switch which is assigned to an output/input has a changeover switch which is arranged in the branching waveguide which connects a junction point to this output/input and is used for optionally switching over between this waveguide and a waveguide which branches off from this waveguide at an additional junction point and leads to an optical sump.

A changeover switch has a waveguide switch which has an optical directional coupler.

A changeover switch has a waveguide switch which has a Mach-Zehnder interferometer.

A changeover switch has a waveguide switch which has a waveguide fork.

A changeover switch having a switch which has more than two switching states, is switched in one switching state to a waveguide which branches off from the junction point of this changeover switch, is switched in another switching state to another waveguide which branches off from this junction point and is switched in a further switching state such that this one branching waveguide and the other branching waveguide are simultaneously blocked.

The changeover switch, which has more than two switching states, has a waveguide switch having transverse index compensation.

The changeover switch, which has more than two switching states, has a DOC switch.

Because of their high level of crosstalk suppression, the optical N×N switching matrices according to the invention can be used particularly advantageously in optical networks, in particular public optical networks, for example telecommunications networks, in which a high level of crosstalk suppression is essential for operation.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which.

FIGS. 2a to 2f show, as a schematic illustration, plan views of different implementations of the changeover and gate switch which is contained in the detail A in FIG. 1 as a detailed illustration, FIG. 4 shows, as a schematic illustration, a plan view of a conventional 1×N switching matrix which is the basis of the switching matrix according to the invention in FIG. 1.

DESCRIPTION OF THE PREFERRED EMBODIMENTS

Figure 1:
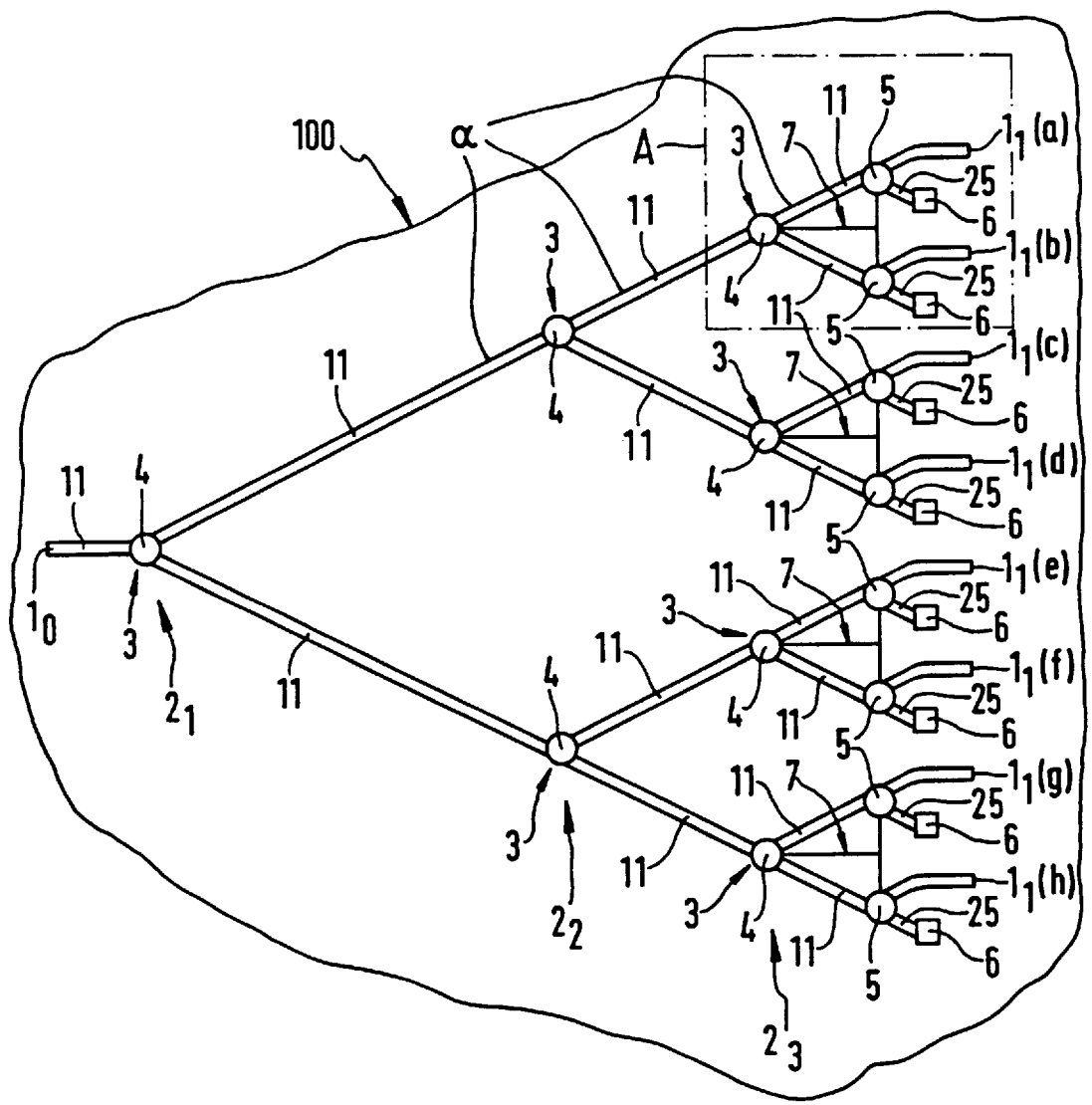
FIG. 1 shows, as a schematic illustration, a plan view of a 1×N switching matrix according to the invention.

The optical 1×N switching matrix according to the invention has an input $1_0$ and $N=2^n$, $n=1, 2, 3 \ldots$ ouputs $1_1$ as well as a waveguide structure which is generally designated 1, comprises a number of $2^0+2^1+\ldots+2^n$ optical waveguides 11 which branch at N−1 junction points 3 like a tree, and which waveguide structure connects the input $1_0$ to each of the outputs $1_1$.

The number n which, as indicated, is any desired integer ≧1 indicates the number of junction stages $2_j$, where j=1 to n, which follow one another from the input $1_0$ in the direction 9 to the outputs $1_1$. Specifically, in the illustrated exemplary embodiment, n is chosen to be 3, that is to say $N=2^3=8$, so that the number of junction points 3 is equal to 7 and the number of wave-guides 11 which branch like a tree is equal to 15.

According to FIG. 1, a waveguide 10 leads from the input $1_0$ to a junction point 3 which forms the first junction stage $2_1$. Two waveguides 11 branch off from this junction point 3 and lead to in each case one of the two junction points 3 in the second junction stage $2_2$.

In each case two, that is to say a total of four, waveguides 11 branch off from each of the two junction points 3 in the second junction stage $2_2$ and lead to in each case one of the total of four junction points 3 in the third and, in this example last, junction stage $2_3$.

In each case two, that is to say a total of eight, waveguides 11 branch off from each of the four junction points 3 in the third junction stage $2_3$ and lead to in each case one of the total of eight outputs $1_1$ in this example.

One optical switch 4 is provided in each case per junction point 3 for optionally switching over between the waveguides 11 which branch off from this junction point 3.

Switching over between the waveguides 11 which branch off from a junction point 3 means that the changeover switch 4 at this junction point 3 in one switching state releases the optical path to one of these branching waveguides 11 and blocks the optical path to the other waveguide 11 and, in another switching state, releases the optical path to the other branching waveguide 11 and blocks the optical path to the one branching waveguide 11.

For example, in one switching state of the changeover switch 4 at the junction point 3 of the first junction stage $2_1$, a light signal which is supplied to this junction point 3 from the input $1_0$ through the waveguide passes only into one waveguide 11, for example the upper of the two waveguides 11 which branch off from this junction point 3, but not into the lower branching waveguide 11. In the upper waveguide 11, the light signal is passed on to the upper junction point 3, which is connected to this waveguide 11, in the second junction stage $2_2$, but not into the lower waveguide 11.

When the changeover switch 4 at this junction point 3 is in the other switching state, the light signal passes only into the lower branching waveguide 11, in which it is passed on to the lower junction point 3 in the second junction stage $2_2$, but not into the upper branching waveguide 11.

The statement made with regard to the junction point 3 in the first junction stage $2_2$ likewise applies to each junction point 3 in all the other junction stages $2_2$, $2_3$ etc.

In practice, the changeover switches 4 are not sufficiently ideal that no element of the light signal which is supplied to the junction point 3 of this changeover switch 4 passes into the blocked branching waveguide 11, but a small proportion of this light signal, which causes crosstalk, also passes into this blocked branching waveguide 11.

In order to suppress the crosstalk effect with respect to an output $1_1$ of the switching matrix to the optical path which is currently not carrying light, an optical gate switch 5 is assigned, according to the invention, to this output $1_1$ for optional optical release and blocking of this output $1_1$ as a function of a switching state of the changeover switch 4 of a junction point 3 from which a branching waveguide 11 leads to this output $1_1$.

Since each output $1_1$, of the switching matrix may be an output leading to the optical path which is currently not carrying light, it is expedient to assign in each case one such gate switch 5 to each output $1_1$ of the switching matrix, by means of which gate switch 5 the crosstalk can be suppressed if required.

The switching matrix according to FIG. 1 is an example of this case. In this switching matrix, two waveguides 11, each of which leads to in each case one of the outputs $1_1$, in each case branches off from each junction point 3 in the last junction stage $2_3$.

A gate switch 5 is in each case arranged in each of these waveguides 11 which branch off from the junction points 3 in the last junction stage $2_3$ and, in one switching state, releases or blocks this waveguide 11, that is to say allows or does not allow a light signal, which is carried in this branching waveguide 11, to pass to the output $1_1$ to which this gate switch 5 is assigned.

A changeover switch 4 at a junction point 3 in the last junction stage $2_3$ from which a branching waveguide 11 leads to an output $1_1$ to which a gate switch 5 is assigned, and this gate switch 5 itself, advantageously comprise an electrically controllable optoelectronic switch having a control electrode arrangement 54 to which [sic] electrical control signals for switching this switch 5 between at least two switching states, the gate switch 5, in one switching state, releasing the output $1_1$ to which it is assigned, and the changeover switch 4 releasing the branching waveguide 11 which leads to this output $1_1$ and, in the other switching state, the changeover switch 4 blocking the branching waveguide 11 which leads to this output $1_1$, and the gate switch 5 blocking this output $1_1$.

In the example according to FIG. 1 this means, for example, for the topmost junction point 3 in the third junction stage $2_3$ and the two outputs $1_1$ which are located one above the other and to which the two wave-guides 11 branch off from this topmost junction point 3 that the changeover switch 4 of this topmost junction point 3, in one switching state, is connected to the upper waveguide 11 which leads to the upper output $1_1$, and releases this waveguide 11 and blocks the lower waveguide 11 which leads to the lower output $1_1$, while, at the same time, the gate switch 5 which is assigned to the upper output $1_1$ and is arranged in the upper branching waveguide 11, releases this upper output $1_1$, and the gate switch 5, which is assigned to the lower output $1_1$ and is arranged in the lower branching waveguide 11, blocks this lower output $1_1$, and that in the other switching state the changeover switch 4 is connected to the lower waveguide 11 which leads to the lower output $1_1$ and releases this lower waveguide 11 and blocks the upper waveguide 11 which leads to the upper output $1_1$, while, at the same time, the gate switch 5 which is assigned to the lower output $1_1$ and is arranged in the lower waveguide 11 releases this lower output $1_1$ and the gate switch 5, which is assigned to the upper output $1_1$ and is arranged in the upper branching waveguide 11, blocks this upper output $1_1$.

This means, in particular, that a gate switch 5 always releases the output $1_1$ assigned to it when the changeover switch 4 at the relevant junction point 3 is switched to the branching waveguide 11 which leads to this output $1_1$, and a gate switch 5 always blocks the output $1_1$ assigned to it when the changeover switch 4 at the relevant junction point 3 blocks the branching waveguide 11 which leads to this output $1_1$.

Since the switching states of the gate switch 5 which is assigned to an output $1_1$ are predetermined by the switching states of the changeover switch 4 of the relevant junction point 3 of the last junction stage $2_3$, additional control lines to the waveguide structure 1 are unnecessary, but a control electrode arrangement 54 of a gate switch 5 and a control electrode arrangement 54 of a changeover switch 4 can be electrically conductively connected to one another by means of an electrical lead arrangement 7, as a result of which the electrical control complexity of a switching matrix according to the invention is not greater than that of a conventional switching matrix. In addition, the electrical lead arrangement 7 can advantageously be integrated, together with the waveguide structure 1, on a substrate 100.

The changeover switch 4 and gate switch 5 may consist of different types of optical switch. FIGS. 2a to 2f show various examples with reference to the topmost junction point 3 of the last junction stage $2_3$ in FIG. 1, these figures showing an enlarged illustration of the detail A in FIG. 1.

These examples can also be used in the same manner for every other junction point 3 in the last junction stage $2_3$ and, in particular, for every junction point in the last junction stage of every other 1×N switching matrix according to the invention.

Figure 2A:
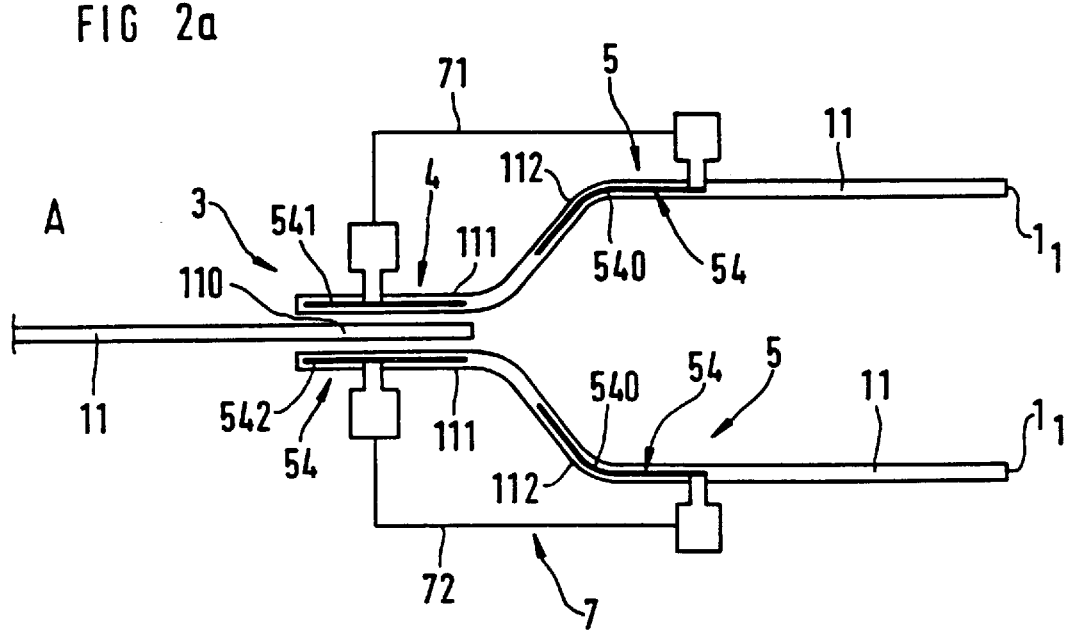

In the example according to FIG. 2a, the changeover switch 4 which is arranged at the junction point 3 comprises a switch having more than two switching states, which in one switching state, is connected to the upper branching waveguide 11 which branches off from the junction point 3 and leads to the upper output $1_1$, and blocks the lower waveguide 11 which branches off from this junction point 3 and leads to the lower output $1_1$, in another switching state in contrast, is connected to the lower branching waveguide 11 and blocks the upper branching waveguide 11, and in a further switching state, is connected in such a manner that both the upper and the lower branching waveguides 11 are blocked at the same time.

The gate switch 5 which is assigned to the upper output $1_1$ is arranged in the upper branching waveguide 11 which leads to this output $1_1$, and the gate switch 5 which is assigned to the lower output $1_1$ is arranged in the lower branching waveguide 11 which leads to this output $1_1$, and each consists of an on and off switch which optionally releases or blocks the relevant waveguide 11.

The changeover switch 4 may consist, for example, of a known TIC switch (see B. Acklin, M. Schienle, B. Weiss, L. Stoll, G. Muller "Novel optical switches based on carrier injection in three and five waveguide couplers: TIC and SIC" Electron. Lett., 1994, Vol. 30, No. 3, page 217). According to this, the changeover switch 4 is in principle designed such that an end section 110 of the waveguide 11 which branches off from the upper junction point 3 of the second junction stage $2_2$ and leads to the topmost junction point 3 of the third junction stage $2_3$, and opposite end sections 111 of the waveguides 11 which branch off from the topmost junction point 3 are arranged on both sides of the end section 110 of the waveguide 11 which leads to the topmost junction point 3, at such a short distance from this waveguide 11 that an optical signal which passes in this waveguide 11 to its end section 110 is coupled over from this end section 110 into one or the other branching waveguide 11, depending on how the electrodes 541 and 542 of the control electrode arrangement 54 of this changeover switch 4, which are located above the end sections 111 of these branching waveguides 11, are electrically connected.

The gate switch 5, which is designed as an on and off switch, of each of the two waveguides 11 which branch off from the topmost junction point 3 has a control electrode arrangement 54 in the form of an individual control electrode 540 which extends over a section 112 of this branching waveguide 11 and influences the material, which is located underneath, of the branching waveguide 11, depending on the switching state, in such a manner that an optical signal which is supplied from the end section 111 of this branching waveguide 11 is either passed through or is absorbed. At the same time, the signal which is passed through can also be optically intensified. The absorption which causes blocking of the relevant branching waveguide 11 can also be replaced by the signal which is being carried being radiated out laterally from this waveguide 11, in the longitudinal section 112.

The electrical lead arrangement 7 connects an electrode 541 of the switch 4 through an electrical lead 71 to the electrode 540 of the gate switch 5 which is arranged in the upper branching waveguide 11, and connects the other electrode 541 of the changeover switch 4 through an electrical lead 72 to the electrode 540 of the gate switch 5 which is arranged in the lower branching waveguide 11.

In one switching state, a voltage $U_1$ is applied to one electrode 541 of the changeover switch 4 and that electrode 540 of a gate switch 5 which is connected to this electrode 541, and another voltage $U_2$ is applied to the other electrode 541 of the changeover switch 4 and to that electrode 540 of the other gate switch 5 which is connected to this other electrode 541.

These two voltages $U_1$ and $U_2$ result, for example, in an optical signal which is supplied to the changeover switch 4 being coupled over into the upper branching waveguide 11 and being passed through from the gate switch 5, which is arranged in this waveguide 11, to the upper output $1_1$, while, in the lower branching waveguide 11, an undesirable small element of this signal is always coupled over into this lower branching waveguide 11 and is blocked by the gate switch 5 which is arranged in this lower branching waveguide 11, so that this element does not reach the lower output $1_1$.

If, conversely, the voltage $U_1$ is applied to the other electrode 541 of the changeover switch 4 and to the electrode 540, which is connected by the lead 72 to this other electrode 541, of the gate switch 5 which is arranged in the lower waveguide 11, and the voltage $U_2$ is applied to one electrode 541 of the changeover switch 4 and to the electrode 540, which is connected to this electrode 541, of the gate switch 5 which is arranged in the upper waveguide 11, the relationships are precisely reversed, that is to say the optical signal which is supplied is coupled over into the lower branching waveguide 11 and is passed through by the gate switch 5, which is arranged in this waveguide 11, to the lower output $1_1$, while an undesirable element of this signal is always coupled over into the upper branching waveguide 11 and is blocked by the gate switch 5 which is arranged in this upper waveguide 11, so that this element does not reach the upper output $1_1$.

The examples according to FIGS. 2b to 2f differ from the example according to FIG. 2a essentially in that each gate switch 5 consists of a changeover switch for optionally switching over between the branching waveguide 11, in which this gate switch 5 is arranged, and of a waveguide 25, which branches off from this waveguide 11 in an additional junction point 30 and leads to an optical sump 6.

Figure 2B:
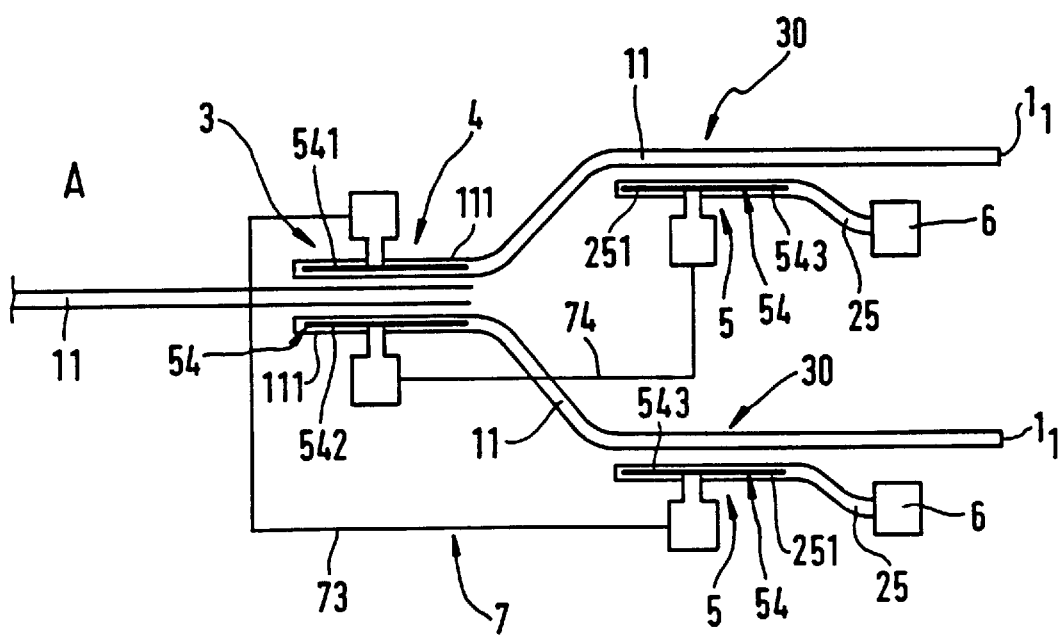

In the example according to FIG. 2b, the changeover switch 4 which is arranged in the junction point 3 is structurally identical to the changeover switch 4 according to FIG. 2a, but each gate switch 5 is, in contrast, a changeover switch in the form of a controllable optical directional coupler, which is generally known.

The directional coupler of the upper or lower branching waveguide 11 which leads from the junction point 3 to the upper or lower output $1_1$, respectively, is formed in such a manner that an end section 251 of the waveguide 25, which branches off from this upper or lower branching waveguide 11, respectively, is arranged at such a short distance from the upper or lower branching waveguide 11, respectively, in the additional junction point 30 that optical power can be coupled over between this end section 251 and the upper or lower branching waveguide 11, respectively, it being possible to control this coupling over in a known manner by means of a control electrode arrangement 54, in such a manner that an optical signal which is carried in the upper or lower branching waveguide 11, respectively, is either passed on in this waveguide 11 to the upper or lower output $1_1$, respectively, and is not coupled over into the waveguide 25 which leads to the optical sump 6, or is coupled over into the waveguide 25 which leads to the optical sump 6 and is not passed on in the upper or lower branching waveguide 11, respectively, to the upper or lower output $1_1$, respectively. Any radiation which is coupled over into the waveguide 25 which leads to the optical sump 6 is rendered harmless in the optical sump 6.

The control electrode arrangement 54 may, for example, consist of an electrode 543 which branches off above the upper or lower branching waveguide 11, respectively, or the waveguide 25 which branches off from this waveguide 11 and leads to the optical sump 6, and is arranged in the region of the end section 251 of the waveguide 25.

In the example according to FIG. 2b, such an electrode 543 is in each case provided above the end section 251 of the waveguide 25 which leads to the optical sump 6. An electrical lead arrangement 7 has an electrical lead 74 which connect the electrode 543, via the end section 251 of the waveguide 25 which branches off from the upper branching waveguide 11, to the electrode 542 which is arranged above the end section 111, which is located in the junction point 3, of the lower branching waveguide 11, while the electrode 543 is connected via the end section 251 of the waveguide 25, which branches off from the lower branching waveguide 11, to the electrode 541, which is arranged above the end section 111, which is located in the junction point 3, of the upper branching waveguide 11, by means of an electrical lead 73 in the lead arrangement.

As a result of this type of electrical connection of the electrodes 541, 542 and 543, it is possible, in a similar manner to that in the example according to FIG. 2a by application of a voltage difference of one polarity between the lead 73 and the lead 74, to achieve the switching state in which the optical signal, which is carried in the supplying waveguide 11 to the junction point 3, is coupled over into the upper branching waveguide 11 and is supplied to the upper output $1_1$, while, at the same time, an undesirable element of this supplied signal, which is coupled over into the lower branching waveguide 11, is coupled over into the waveguide 25 which branches off from this lower branching waveguide 11 and is rendered harmless in the sump 6 which is connected to this waveguide 25, and by application of a voltage difference of the opposite polarity between the lead 73 and the lead 74, to achieve the other switching state, in which the optical signal which is supplied to the junction point 3 is coupled over into the lower branching waveguide 11 and is supplied to the lower output $1_1$, while, at the same time, an element of this supplied signal which is coupled over into the upper branching waveguide 11 is coupled over into the waveguide 25, which branches off from this upper branching waveguide 11, and is rendered harmless in the optical sump 6 which is connected to this waveguide 25.

The examples according to FIGS. 2a and 2b differ from the examples 2c to 2f described in the following text in that the changeover switch 4 which is arranged in the junction point 3 has a different structure than the two gate switches 5.

In contrast to this, in the examples according to is FIGS. 2c to 2f, the changeover switch 4 which is arranged in the junction point 3 and the gate switches 5 which are likewise designed as changeover switches are advantageously and essentially of the same design.

In the example according to FIG. 2c, the changeover switch 4 which is arranged in the junction point 3, like the examples according to FIGS. 2a and 2b, comprises a changeover switch having more than two switching states. Furthermore, each gate switch 5 is a changeover switch like the changeover switch 4, for example a TIC switch.

In the example according to FIG. 2c, both the upper branching waveguide 11 which leads from the junction point 3 to the upper output $1_1$ and the lower branching waveguide 11 which leads from the junction point 3 to the lower output $1_1$ are split into in each case one first waveguide section $11_1$ and in each case one second waveguide section $11_2$, which is separated from the first waveguide section.

The first waveguide section $11_1$ of each branching waveguide 11 has, on the one hand, an end section 111 which is located in the junction point 3 and forms the end section 111 of the changeover switch 4 according to FIG. 2a and, on the other hand, has an opposite end section 110, which corresponds to the end section 110 in the changeover switch 4 according to FIG. 2a.

The second section $11_2$ of each branching waveguide 11 has, on the one hand, an end section 111 which is arranged at a short distance from the end section 110 of the first waveguide section $11_1$, of this branching waveguide 11 and corresponds to the end section 111 in the changeover switch 4 according to FIG. 2a, and is, on the other hand, connected to the output $1_1$ to which this branching waveguide 11 leads.

An end section 111 of a waveguide 25 is arranged a short distance away on that side of the end section 110 of the first section $11_1$ of this branching waveguide which faces away from the second waveguide section $11_2$ of each branching waveguide 11, and this end section 111 corresponds to the end section 111 in the changeover switch 4 according to FIG. 2a, forms the waveguide which branches off from this branching waveguide 11 in the additional junction point 30, and leads to an optical sump 6.

The end section 110 of the first waveguide section $11_1$, of each branching waveguide 11, and the adjacent end sections 111 of the second waveguide section $11_2$ of this branching waveguide 11 and of the waveguide 25 which branches off from this waveguide 11, together with an electrode arrangement 54 which is arranged in the region of these end sections 110 and 111, define the gate switch 5, which is arranged in this branching waveguide 11 and is in the form of a changeover switch.

The electrode arrangement 54 of the gate switch 5, which is arranged in each branching waveguide 11 and is in the form of a changeover switch, comprises an electrode 541, which is arranged above the end section 111 of the second waveguide section $11_2$ of this branching waveguide 11, and an electrode 542, which is arranged above the end section 111 of the waveguide 25 which branches off from this branching waveguide 11.

The end section 110 of the waveguide 11 which leads to the junction point 3, and those end sections 111 of the first waveguide section $11_1$, of the upper and lower branching waveguides 11 which are arranged on both sides of this end section 110, together with an electrode arrangement 54 which is arranged in the region of these end sections 110 and 111, define the changeover switch 4 which is arranged in this junction point 3.

The electrode arrangement 54 of the changeover switch 4 in the junction point 3 comprises an electrode 541, which is arranged above the end section 111 of the first waveguide section $11_1$, of the upper branching waveguide section 11, and an electrode 542, which is arranged above the end section 111 of the first waveguide section $11_1$, of the lower branching waveguide 11.

An electrical lead arrangement 7 has an electrical lead 75 which connects the electrodes 541 of the end sections 111 of the first and second waveguide sections $11_1$ and $11_2$ of the upper branching waveguide 11, and the electrode 542 of the end section 111 of the waveguide 25 which branches off from the lower branching waveguide 11, and has an electrical lead 76, which connects the electrodes 541 of the end sections 111 of the first and second waveguide sections $11_1$ and $11_2$ of the lower branching waveguide 11, and the electrode 542 of the end section 111 of the waveguide 25 which branches off from the upper branching waveguide 11.

As a result of this type of electrical connection of the electrodes 541, 542 and 543, it is possible, in a similar manner to that in the example according to FIG. 2b by application of a voltage difference of one polarity between the lead 75 and the lead 76, to achieve the switching state in which the optical signal, in which the optical signal which is supplied to the end section 110 of the supplying waveguide 11 is coupled over into the first waveguide section $11_1$ of the upper branching waveguide 11 which leads to the upper output $1_1$, and is coupled over from this first waveguide section $11_1$ into the second waveguide section $11_2$ of this upper waveguide 11 and passes to the upper output $1_1$, while an undesirable element of this signal which is coupled over into the first waveguide section $11_1$ of the lower branching waveguide 11 which leads to the lower output $1_1$ is coupled over into the waveguide 25 which branches off from this lower waveguide 11, and is supplied to the optical sump 6 which is connected to this waveguide 25, and by application of a voltage difference of the opposite polarity between the lead 75 and the lead 76, to achieve the switching state in which the optical signal which is supplied to the end section 110 of the supplying waveguide 11 is coupled over into the first waveguide $11_1$ of the lower branching waveguide 11 which leads to the lower output $1_1$, and is coupled over from this first waveguide section $11_1$ into the second waveguide section $11_2$ of this lower waveguide 11 and is supplied to the lower output $1_1$, while an undesirable element of this signal which is coupled over into the first waveguide section $11_1$ of the upper branching waveguide 11 is coupled over into the waveguide 25 which branches off from this upper branching waveguide 11, and is supplied to the optical sump 6 which is connected to this waveguide 25.

In addition, a further switching state is possible in which supplied signals are not coupled over and passed on either in the changeover switch 4 or in the gate switches 5.

The arrangement according to FIG. 2d differs from the arrangement according to FIG. 2c in that, instead of the TIC switches, known DOS switches, which likewise have more than two switching states, are used as changeover switches, in which in each case one waveguide fork 40 having an electrode arrangement 54 is arranged in the junction point 3 and the additional junction points 30.

The waveguide 11 which leads to the junction point 3 is split in said point 3 in the region of the fork 40 into the upper and lower branching waveguides 11, which waveguides 11 lead, respectively, to the upper and lower output $1_1$. From the upper and lower branching waveguide 11, respectively, the waveguide 25 which branches off from this waveguides 11 branches in the relevant additional junction point 30, in the region of the fork 40 which is arranged there, and leads to an optical sump 6.

The electrode arrangement 54 has two electrodes 544 and 545 in the region of each fork 40. In the case of the fork 40 in the changeover switch 4, the electrode 544 is arranged above the fork branch from which the upper branching waveguide 11 branches off, and the electrode 545 is arranged above the fork branch from which the lower branching waveguide 11 branches off. In the case of the fork 40 in the gate switch 5 of each branching waveguide 11, the electrode 544 is arranged above the fork branch which is arranged in this branching waveguide 11 and forms a section of this waveguide 11, and the electrode 545 is arranged above the fork branch from which that waveguide 25 which branches off from this waveguide 11 branches.

In comparison with the examples according to FIGS. 2c and 2d, the electrode 544 corresponds to the electrode 541, and the electrode 545 corresponds to the electrode 542, both in the changeover switch 4 and in each gate switch 5.

In the example according to FIG. 2d, precisely the same switching behaviour as in the case of the example according to FIG. 2c can be achieved by the same lead arrangement 7 of leads 75 and 76 which electrically connect the electrodes 544 and 545 in the same manner as the electrodes 541 and 542, respectively, in the example according to FIG. 2c.

In the example according to FIG. 2e, the changeover switch 4 and the gate switches 5 each comprise a changeover switch in the form of a known controllable optical directional coupler, as is used, for example, in the example according to FIG. 2b for the gate switches 5.

In the case of the example according to FIG. 2e, the example is set up, for example, such that the waveguide 11 which leads to the junction point 3 merges in this junction point 3, without any interruption, into the branching waveguide 11 which leads to an output $1_1$, for example the lower branching waveguide 11 which leads to the lower output $1_1$. The branching waveguide 11 which leads to the other output $1_1$, in the example the upper output $1_1$, is split in a similar way to that in the case of the example according to FIG. 2b into a first waveguide section $11_1$, and a second waveguide section $11_2$, which is separated from it.

The first waveguide section $11_1$, has an end section 112 which is arranged at a short distance from the waveguide 11, which leads to this junction point 3, in the region of the changeover switch 4 in said junction point 3, and, together with this waveguide 11 and an electrode arrangement 54, defines the directional coupler of the changeover switch 4.

The first waveguide section $11_1$ of the upper branching waveguide 11 in the example merges in the additional junction point 30, without any interruption, into the waveguide 25 which branches off from this upper branching waveguide 11 and leads to an optical sump 6.

The second waveguide section $11_2$ of the upper branching waveguide 11 leads to the upper output $1_1$ and has an end section 113 in the additional junction point 30 of this upper waveguide 11, in the region of the gate switch 5 which is arranged in this upper waveguide 11, which end section 113, together with the first waveguide section $11_1$ and an electrode arrangement 54, defined to the directional coupler of this gate switch 5.

A waveguide 25 branches off from the lower branching waveguide 11 in an additional waveguide 11 in an additional junction point 30, leads to an optical sump and, in the region of the gate switch 5 which is arranged in this lower branching waveguide 11, has an end section 114 which is arranged at a short distance from the lower branching waveguide 11 and, together with this waveguide 11 and an electrode arrangement 54, defines the directional coupler of this gate switch 5.

The electrode arrangement 54 of the changeover switch 4 and of each gate switch 5 in this example according to FIG. 2e is formed by in each case one electrode 543, which arranged above the end section 112, the end section 113 and the end section 114, which electrodes are electrically conductively connected to one another by, for example, a lead arrangement 7 in the form of a lead 75. The directional couplers of the changeover switch 4 and of the gate switches 5 can be controlled in the correct manner by the electrodes 543 which are electrically connected to one another in such a manner, such that an optical signal which is supplied in the waveguide 11 which leads to the junction point 3 passes either only to the upper output $1_1$ or only to the lower output $1_1$, and undesired elements of this signal pass into the upper or lower sump 6, respectively, and not to an output $1_1$.

The example according to FIG. 2f differs from the example according to FIG. 2e only in that the optical directional couplers in the example according to FIG. 2e are replaced in the example according to FIG. 2f by known integrated optical Mach-Zehnder interferometers.

Each of the interferometers has, in a known manner, an optical coupler 61 which splits an optical signal, which is supplied in a supplying waveguide 11, between two inteferometer arms 62 and 63 which are composed of optical waveguides, and has an optical coupler 64 which causes the signal elements which are supplied in the interferometer arms to interfere with one another and then switches to one or the other of two continuing waveguides 11 or 11 and 25 as a function of an electrical control signal which is applied to one electrode arrangement 54.

The electrode arrangement 54 of each interferometer comprises, for example, an electrode 546 which is arranged above one interferometer arm 63 and functionally corresponds to the electrode 543 in the example according to FIG. 2e. A lead arrangement 7 which comprises an electrical lead 75 and connects the three electrodes 546 to one another ensures that the example according to FIG. 2f has the same switching behavior as the example according to FIG. 2e.

The 1×N switching matrix according to the invention can in principle and, in particular, be operated bidirectionally in the illustrated exemplary embodiments, that is to say each output $1_1$ can be an input for an optical signal which can be carried in the waveguide structure 1 to the single input $1_0$, so that the previous input $1_0$ can also be an output. This is taken account of in the claims in that $1_0$ is designated the "input/output" and $1_1$ is designated the "output/input". This advantageous characteristic of the 1×N switching matrix according to the invention is important for the N×N switching matrix according to the invention.

Figure 3:
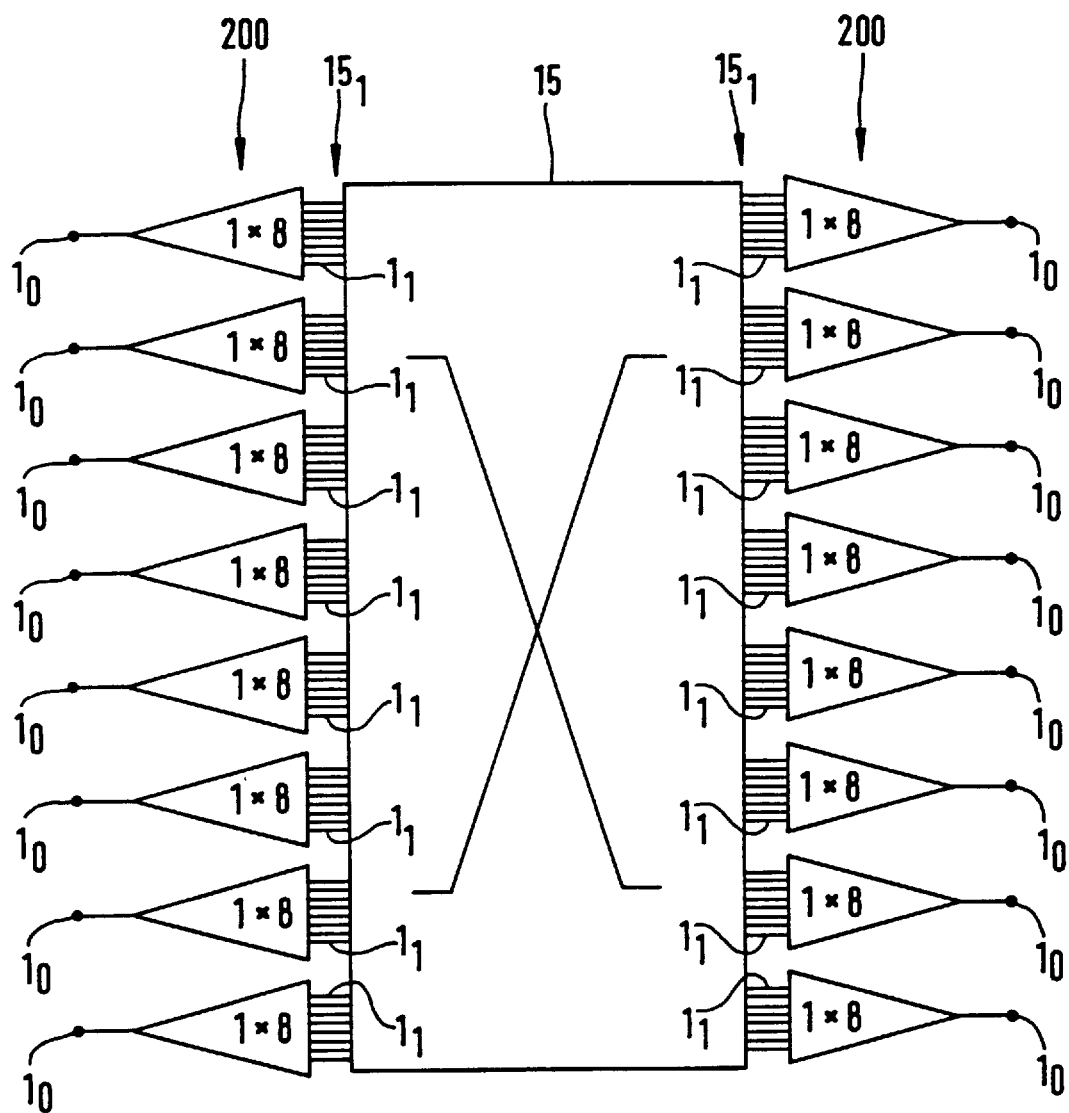
FIG. 3 shows, as a schematic illustration, a plan view of an N×N switching matrix according to the invention which is implemented using 1×N switching matrices according to the invention.

An N×N switching matrix according to the invention is illustrated by way of example and schematically for N=8 in FIG. 3. This switching matrix has a central optical switching network 15 with a connection row $15_1$, composed of in each case 8×8=64 optical connections on the left-hand side and a connection row $15_1$ composed of in each case 8×8=64 optical connections on the right-hand side of this network, each connection being used as an optical input and/or output of the switching network 15, and the switching network 15 being designed internally in such a manner that each connection in the connection row $15_1$ on the left-hand side can be connected optically to each connection in the connection row $15_1$ on the right-hand side, and vice versa. The switching network 15 may be, for example, a generally known perfect shuffle.

Arranged on the left-hand side of the switching network 15 is a matrix row 200 comprising in each case eight optical 1×8 switching matrices according to the invention, each 1×8 switching matrix having in each case one optical input/output $1_0$ and in each case eight optical outputs/inputs $1_1$, of which in each case only one is provided with this reference signal $1_1$ in each 1×8 switching matrix.

Likewise located on the right-hand side of the optical switching network 15 is a matrix row 200 comprising in each case eight optical 1×8 switching matrices according to the invention, each 1×8 switching matrix having in each case one optical input/output $1_0$ and in each case eight optical outputs/inputs $1_1$, of which in each case only one is provided with this reference symbol $1_1$, once again, in each 1×8 switching matrix.

The total of 8×8=64 optical outputs/inputs $1_1$ in the eight optical 1×8 switching matrices in the matrix row 200 on the left-hand side of the switching network 15 are connected in parallel to the 8×8=64 optical connections in the connection row $15_1$ on this left-hand side and the total of 8×8=64 optical outputs $1_1$ of the eight optical 1×8 switching matrices in the matrix row 200 on the right-hand side of the switching network 15 are connected in parallel to the 8×8=64 optical connections in the connection row $15_1$ on this right-hand side.

The total of eight optical inputs/outputs $1_0$ of the eight optical 1×8 switching matrices in the matrix row 200 on the left-hand side of the switching network 15 form the inputs or outputs of the 8×8 switching matrix, and the total of eight optical inputs/outputs $1_0$ of the eight 1×8 switching matrices in the matrix row 200 on the right-hand side of the switching network 15 form the eight outputs and inputs of the 8×8 switching matrix which can be operated bidirectionally not only when N=8.

Each 1×8 switching matrix in FIG. 3 may comprise the exemplary 1×8 switching matrix according to FIG. 1.

FIG. 4 shows a conventional 1×N switching matrix without a gate switch 5, for comparison with the 1×N switching matrix according to the invention in FIG. 1, parts which otherwise correspond being provided with the same reference symbols.

The 1×N switching matrices and N×N switching matrices according to the invention have the advantage that the crosstalk suppression is greatly improved, no additional control complexity is required, the insertion loss is increased only to a minimal extent, and no additional production costs are necessary.

In the case of the 1×N switching matrix according to the invention, the crosstalk suppression is increased by that of the gate switch 5 for each optical path from the input/output $1_0$ to an output/input $1_1$.

In the following text, data for the 1×8 switching matrix according to the invention in FIG. 1 are compared with the conventional 1×8 switching matrix according to FIG. 4, it being assumed that both the changeover switch 4 and the gate switches 5 are TIC switches having more than two switching states. In order to distinguish more clearly between the outputs/inputs $1_1$, these inputs/outputs are additionally provided with the letters a to h in brackets in FIGS. 1 and 4.

If, for example, the changeover switch 4 in the topmost junction point 3 in the last junction stage $2_3$ is switched such that the signal light is passed via the upper of the two waveguides 11 which branch off from this topmost junction point 3, to the output a, the crosstalk light from the lower of the two waveguides 11 which branch off from this topmost junction point 3 and lead to the output b is at the same time passed through the waveguide 25, which branches off from this lower branching waveguide 11, into the sump 6 which is connected to this waveguide.

It is assumed for driving the 1×8 switching matrix that only those changeover switches 4 and gate switches 5 are electrically driven through which the intended optical path passes. In accordance with the design of the 1×8 switching matrix according to the invention, only two gate switches 5 are driven in this case.

If, for example, the optical path α leading from the input $1_0$ to the output a is selected, then the changeover switch 4 of the junction point 3 in the first junction stage $1_1$ is switched to the upper waveguide 11 which branches off from this junction point 3 and leads to the upper junction point 3 in the second junction stage $2_2$. The changeover switch 4 which is located in this junction point 3 is switched to the upper waveguide 11 which branches off from this junction point 3 and leads to the topmost junction point 3 in the third junction stage $2_3$. The changeover switch which is located in this topmost junction point 3 is switched to the upper branching waveguide 11 which leads from this topmost junction point 3 to the output a. The gate switch 5 which is located in this waveguide 11 is switched such that the signal light passes to this output a. In contrast, the gate switch 5, which is located in the lower branching waveguide 11 which leads from the topmost junction point 3 to the output b, is switched such that the crosstalk light which is carried in this waveguide 11 is not passed to the output b, but to the sump 6 which is connected to this gate switch 5 by the waveguide 25 which branches off from this lower branching waveguide 11. All the other changeover switches 4 and gate switches 5 are in the third switching state, in which no signal light passes through the changeover switches 4 and the gate switches 5.

It is assumed for each changeover switch 4 and each gate switch 5 that the transmission when the optical path is released is −1 dB, is −11 dB when the optical path is blocked, and is −6 dB in the third switching state, in which both optical paths are intended to be blocked.

The following table shows the crosstalk powers of the 1×8 switching matrix in FIG. 1 for this case, in comparison with the 1×8 switching matrix in FIG. 4 for the case when the topmost output a of both matrices is driven via the optical path α.

| Output | Light power FIG. 4 [dB] | Light power FIG. 1 [dB] | Crosstalk FIG. 4 [dB] | Crosstalk FIG. 1 [dB] | Improvement [dB] |
|---|---|---|---|---|---|
| a | −3 | −4 | — | — | −1 |
| b | −13 | −24 | −10 | −20 | 10 |
| c | −18 | −24 | −15 | −20 | 10 |
| d | −18 | −24 | −15 | −20 | 5 |
| e | −23 | −29 | −20 | −25 | 5 |
| f | −23 | −29 | −20 | −25 | 5 |
| g | −23 | −29 | −20 | −25 | 5 |
| h | −23 | −29 | −20 | −25 | 5 |

These transmission values show that the 1×8 switching matrix according to the invention produces a considerable improvement of 10 dB in the crosstalk suppression, in particular on the main crosstalk path leading to the output b. The price of this is only a minor increase of 1 dB in the insertion loss. Overall, the usable window (=power difference between the highest power crosstalk channel and the wanted channel) of the 1×8 switching matrix according to the invention is increased by 10 dB in comparison with the conventional 1×8 switching matrix.

A corresponding increase in the window of 20 dB can be expected for an 8×8 switching matrix constructed using these 1×8 switching matrices according to the invention, which is extraordinarily advantageous from the systems engineering point of view.

In general, for an N×N switching matrix according to the invention, the worst case crosstalk suppression CT turns out to be $$CT = 2CT_1 + 2CT_2 - 10 \log (\log_2(N)),$$

where $CT_1$ is the crosstalk suppression of a gate switch 5 and $CT_2$ is the crosstalk suppression of a changeover switch 4, the attenuation values are quoted in dB and the approximation stated in R. A. Spanke "Architectures for large non-blocking optical space switches", IEEE J. Quantum Electronics, Vol. QE-22, No. 6, page 964, 1987 is used.

In the case of conventional N×N switching matrices without any gate switches 5 according to the invention, and in the case of which $CT_1$ is omitted, the crosstalk suppression may be poorer than 20 dB.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An optical 1×N switching matrix having a tree structure with an optical input/output and a number N of optical outputs/inputs comprising:

an optical waveguide structure which connects the input/output to each output/input and which is composed of optical waveguides which branch in a tree configuration from the input/output in a direction of the outputs/inputs at junction points;

a plurality of optical changeover switches, an optical changeover switch per junction point, respectively, for optionally switching over between waveguides which branch off from the junction point;

an optical gate switch assigned to at least one respective output/input of the optical outputs/inputs for optional optical release and blocking of the respective output/input as a function of a switching state of a changeover switch of a junction point from which one branching waveguide is connected to the respective output/input.

2. The switching matrix as claimed in claim 1, wherein one respective gate switch is respectively assigned to each output/input for optional release and blocking of the respective output/input as a function of a switching state of a changeover switch of a junction point from which a branching waveguide is connected to the respective output/input.

3. The switching matrix as claimed in claim 1, wherein at least the waveguide structure, the changeover switch and the gate switch of a 1×N switching matrix are integrated on a common substrate.

4. The switching matrix as claimed in claim 1, wherein a respective changeover switch of a respective junction point from which a respective branching waveguide is connected to an output/input to which a respective gate switch is assigned, and the respective gate switch itself, each being an electrically controllable optoelectronic switch having an electrode arrangement that receive electrical control signals for switching the respective changeover switch between at least two switching states, the respective gate switch, in one of the switching states, releasing the output/input to which the respective gate switch is assigned, and the respective changeover switch being switched to the branching waveguide which is connected to the respective output/input and releasing the waveguide, and, in the other switching state, the respective changeover switch blocking the branching waveguide, and the gate switch blocking the respective output/input.

5. The switching matrix as claimed in claim 4, wherein the electrode arrangement of a gate switch and the electrode arrangement of a changeover switch are conductively connected to one another by an electrical lead arrangement.

6. The switching matrix as claimed in claim 1, wherein a gate switch, which is assigned to a respective output/input, has an on and off switch which is arranged in the branching optical waveguide which connects a junction point to the respective output/input.

7. The switching matrix as claimed in claim 1, wherein a gate switch, which is assigned to a respective output/input, has a changeover switch which is arranged in the branching waveguide which connects a junction point to the respective output/input and which is used for optionally switching over between the branching waveguide and a further waveguide which branches off from the branching waveguide at an additional junction point and which leads to an optical receiver.

8. The switching matrix as claimed in claim 1, wherein each of the changeover switches is a waveguide switch which has an optical directional coupler.

9. The switching matrix as claimed in claim 1, wherein each of the changeover switches is a waveguide switch which has a Mach-Zehnder interferometer.

10. The switching matrix as claimed in claim 1, wherein each of the changeover switches is a waveguide switch which has a waveguide fork.

11. The switching matrix as claimed in claim 1, wherein each of the changeover switches is a switch which has more than two switching states, which is switched in one switching state to one waveguide which branches off from a respective junction point of a respective changeover switch, is switched in another switching state to another waveguide which branches off from the respective junction point and which is switched in a further switching state such that the one branching waveguide and the other branching waveguide are simultaneously blocked.

12. The switching matrix as claimed in claim 11, wherein the changeover switch which has more than two switching states is a waveguide switch.

13. The switching matrix as claimed in claim 11, wherein the changeover switch which has more than two switching states is a DOS switch.

14. An optical N×N switching matrix having a tree structure with a number N of optical inputs and a number N of optical outputs, comprising:

two matrix rows, each having N optical 1×N switching matrices, each 1×N switching matrix having one optical input/output and N optical outputs/inputs;

an optical switching network having two connection rows each row having N×N optical connections, each of which is used as an optical input and/or output, each connection in one connection row being optically connectable to each connection in the other connection row;

a total of N×N optical outputs/inputs of the N optical 1×N switching matrices in each matrix row being connected in parallel to the N×N optical connections of in each case one connection row; and a total of N optical inputs/outputs of the N optical 1×N switching matrices of each matrix row forming the N inputs and/or N outputs of the N×N switching matrix;

at least one optical 1×N switching matrix being a 1×N switching matrix having a tree structure with an optical input/output and a number N of optical outputs/inputs;

the optical 1×N switching matrix having an optical waveguide structure which connects the input/output to each output/input and which is composed of optical waveguides which branch in a tree configuration from the input/output in a direction of the outputs/inputs at junction points;

the optical 1×N switching matrix having a plurality of optical changeover switches, an optical changeover switch per junction point, respectively, for optionally switching over between waveguides which branch off from the junction point;

the optical 1×N switching matrix having an optical gate switch assigned to at least one respective output/input of the optical outputs/inputs for optional optical release and blocking of the respective output/input as a function of a switching state of a changeover switch of a junction point from which one branching waveguide is connected to the respective output/input.

15. The switching matrix as claimed in claim 14, wherein each optical 1×N switching matrix is a 1×N switching matrix.

16. The switching matrix as claimed in claim 14, wherein one respective gate switch is respectively assigned to each output/input for optional release and blocking of the respective output/input as a function of a switching state of a changeover switch of a junction point from which a branching waveguide is connected to the respective output/input.

17. The switching matrix as claimed in claim 14, wherein at least the waveguide structure, the changeover switch and the gate switch of a 1×N switching matrix are integrated on a common substrate.

18. The switching matrix as claimed in claim 14, wherein a respective changeover switch of a respective junction point from which a respective branching waveguide is connected to an output/input to which a respective gate switch is assigned, and the respective gate switch itself, each being an electrically controllable optoelectronic switch having an electrode arrangement that receive electrical control signals for switching the respective changeover switch between at least two switching states, the respective gate switch, in one of the switching states, releasing the output/input to which the respective gate switch is assigned, and the respective changeover switch being switched to the branching waveguide which is connected to the respective output/input and releasing the waveguide, and, in the other switching state, the respective changeover switch blocking the branching waveguide, and the gate switch blocking the respective output/input.

19. The switching matrix as claimed in claim 18, wherein the electrode arrangement of a gate switch and the electrode arrangement of a changeover switch are conductively connected to one another by an electrical lead arrangement.

20. The switching matrix as claimed in claim 14, wherein a gate switch, which is assigned to a respective output/input, has an on and off switch which is arranged in the branching optical waveguide which connects a junction point to the respective output/input.

21. The switching matrix as claimed in claim 14, wherein a gate switch, which is assigned to a respective output/input, has a changeover switch which is arranged in the branching waveguide which connects a junction point to the respective output/input and which is used for optionally switching over between the branching waveguide and a further waveguide which branches off from the branching waveguide at an additional junction point and which leads to an optical receiver.

22. The switching matrix as claimed in claim 14, wherein each of the changeover switches is a waveguide switch which has an optical directional coupler.

23. The switching matrix as claimed in claim 14, wherein each of the changeover switches is a waveguide switch which has a Mach-Zehnder interferometer.

24. The switching matrix as claimed in claim 14, wherein each of the changeover switches is a waveguide switch which has a waveguide fork.

25. The switching matrix as claimed in claim 14, wherein each of the changeover switches is a switch which has more than two switching states, which is switched in one switching state to one waveguide which branches off from a respective junction point of a respective changeover switch, is switched in another switching state to another waveguide which branches off from the respective junction point and which is switched in a further switching state such that the one branching waveguide and the other branching waveguide are simultaneously blocked.

26. The switching matrix as claimed in claim 25, wherein the changeover switch which has more than two switching states is a waveguide switch.

27. The switching matrix as claimed in claim 25, wherein the changeover switch which has more than two switching states is a DOS switch.

\* \* \* \* \*